(12) United States Patent
Bonin et al.

(10) Patent No.: US 6,876,509 B2
(45) Date of Patent: Apr. 5, 2005

(54) INTEGRATED ELECTROSTATIC SLIDER FLY HEIGHT CONTROL

(75) Inventors: Wayne A. Bonin, North Oaks, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 413 days.

(21) Appl. No.: 10/055,448

(22) Filed: Jan. 23, 2002

(65) Prior Publication Data

US 2002/0097517 A1 Jul. 25, 2002

Related U.S. Application Data

(60) Provisional application No. 60/264,082, filed on Jan. 25, 2001.

(51) Int. Cl.[7] .............................................. G11B 21/02
(52) U.S. Cl. ........................................................ 360/75
(58) Field of Search ............................. 360/75, 78.05, 360/103; 29/603.12; 427/450

(56) References Cited

U.S. PATENT DOCUMENTS

| | | | |
|---|---|---|---|
| 3,944,683 A | * 3/1976 | Church et al. ............... | 427/450 |
| 4,605,977 A | 8/1986 | Matthews ..................... | 360/103 |
| 4,663,559 A | 5/1987 | Christensen ................. | 313/336 |
| 4,853,810 A | * 8/1989 | Pohl et al. .................. | 360/234.7 |
| 5,082,827 A | 1/1992 | Barnes ......................... | 505/1 |
| 5,153,785 A | 10/1992 | Muranushi et al. .......... | 360/75 |
| 5,920,978 A | * 7/1999 | Koshikawa et al. ....... | 29/603.12 |
| 6,046,596 A | 4/2000 | Schaenzer et al. .......... | 324/662 |
| 6,100,628 A | 8/2000 | Coll et al. .................. | 313/310 |
| 6,359,746 B1 | * 3/2002 | Kakekado et al. .......... | 360/75 |

FOREIGN PATENT DOCUMENTS

| | | |
|---|---|---|
| EP | 0 326 683 A2 | 8/1989 |
| EP | 0 493 885 A2 | 7/1992 |
| JP | 55 150124 | 11/1980 |
| JP | 57 060566 | 4/1982 |
| JP | 63 096756 | 4/1988 |
| JP | 63 183639 | 7/1988 |
| JP | 02 310867 | 12/1990 |
| JP | 2002312967 A | * 10/2002 ........... G11B/7/095 |

* cited by examiner

Primary Examiner—Sinh Tran
Assistant Examiner—K. Wong
(74) Attorney, Agent, or Firm—Westman, Champlin & Kelly

(57) ABSTRACT

A disc drive that includes a slider with a field emission sensor that senses fly height. The sensor has an electrode tip disposed on the slider. The electrode tip faces a media surface across a gap. The sensor conducts a tunneling current through the gap and provides an output representing the length of the gap. An actuator adjusts the fly height spacing. A feedback circuit provides an actuator electrical input as a feedback function of the sensor output to control the fly height spacing.

18 Claims, 7 Drawing Sheets

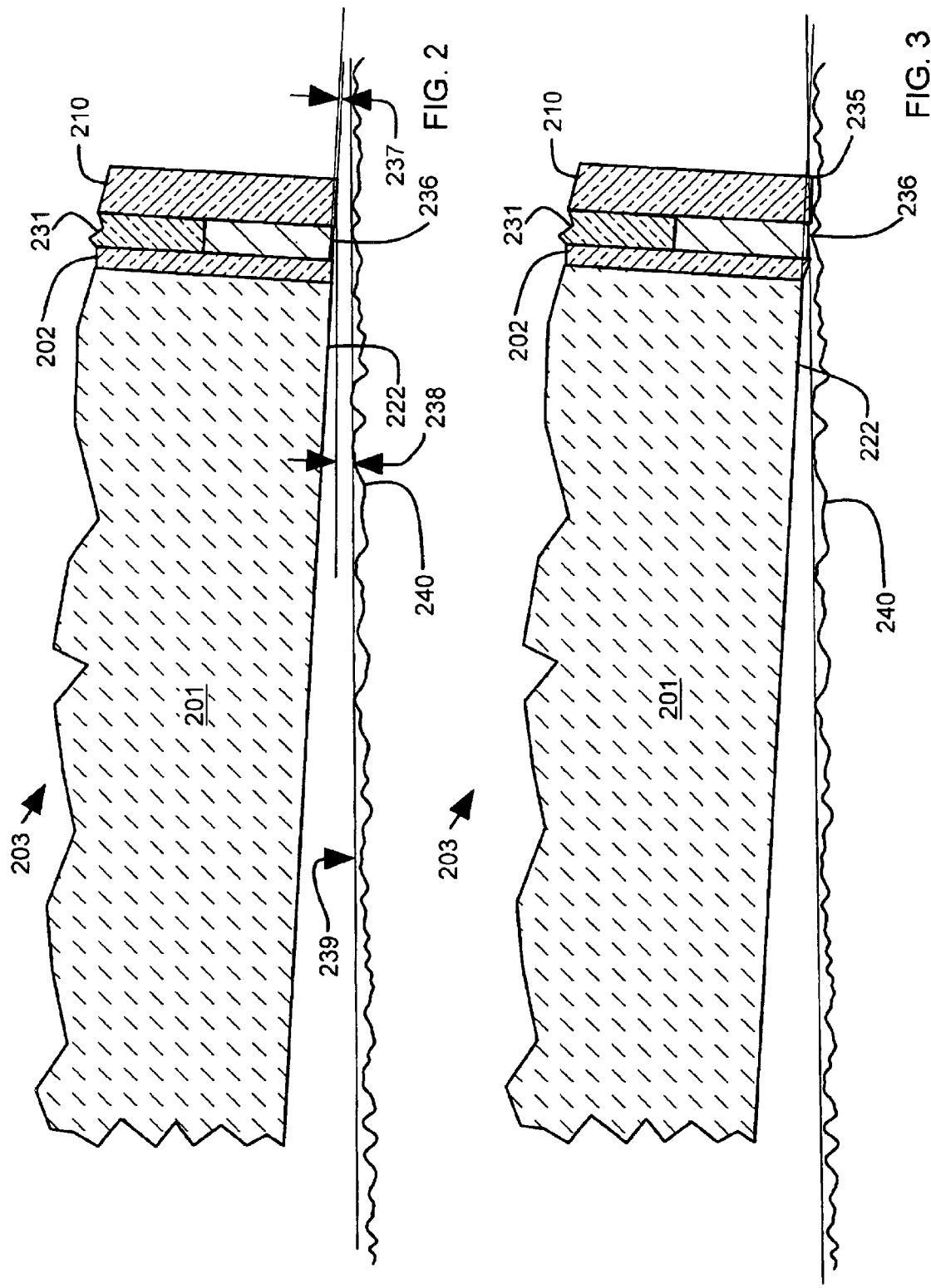

INTEGRATED ELECTROSTATIC SLIDER FLY HEIGHT CONTROL

CROSS-REFERENCE TO RELATED APPLICATION

This application claims priority benefits from U.S. provisional application No. 60/264,082 titled "Integrated Electrostatic Slider Fly Height Control," filed Jan. 25, 2001.

FIELD OF THE INVENTION

The present invention relates generally to disc drive data storage devices, and more particularly without limitation to control of fly height spacing between a slider and a disc.

BACKGROUND OF THE INVENTION

After a disc drive is energized, it warms up and has a temperature rise. In particular, there are large temperature rises in the heads used in a disc drive. The heads include magnetic transducers deposited on slider substrates. The magnetic transducers carry read/write currents that generate heat in the heads. The temperature rise in the heads is large because the heads have a small surface area in relation to the amount of heat that is dissipated in the magnetic transducers.

The magnetic transducers have a higher coefficient of thermal expansion (CTE) than the slider substrates. As temperature increases, the magnetic transducers thermally expand at a greater rate than the slider substrates. The thermal expansion causes the pole/shield tips of the magnetic transducers to protrude with respect to an air bearing surface of the slider substrate. At higher temperatures, the pole/shield tips are closer to the media and the transducer-media spacing is reduced. If the transducer-media spacing at lower temperature is not large enough, then at higher temperatures, the protruding pole/shield tips hit the media.

To avoid transducer-media contact at higher temperatures, the fly height at lower temperatures is kept relatively large. This large fly height at lower temperatures, however, undesirably limits the electrical performance of transducers, particularly the areal bit density (gigabits per square inch) that can be achieved.

A method and apparatus are needed that correct the problems associated with pole tip protrusion at higher temperatures.

SUMMARY OF THE INVENTION

Disclosed are embodiments of a disc drive that includes a slider with a field emission sensor that senses fly height.

The disc drive comprises a disc that includes a media surface, a slider that includes a read/write head that is spaced apart from the media surface by a fly height spacing, a field emission sensor, an actuator and a feedback circuit.

The sensor comprises an electrode tip disposed on the slider. The electrode tip faces a first portion of the media surface across a gap. The sensor conducts an electric current through the gap and provides a sensor electrical output representative of the length of the gap.

The actuator adjusts the fly height spacing as a function of a received actuator electrical input. A feedback circuit provides the actuator electrical input as a feedback function of the sensor electrical output to control the fly height spacing.

These and various other features as well as advantages which characterize embodiments of the present invention will be apparent upon reading of the following detailed description and review of the associated drawings.

BRIEF DESCRIPTION OF THE DRAWINGS

FIG. 2 schematically illustrates a cross-section of a slider at room temperature flying over a disc surface.

FIG. 3 schematically illustrates a cross-section of a slider at elevated temperatures with pole tip protrusion flying over a disc surface.

DETAILED DESCRIPTION OF ILLUSTRATIVE EMBODIMENTS

In the embodiments illustrated below, a disc drive includes a slider with a field emission sensor that senses fly height by passing quantum mechanical tunneling current across a gap between the slider and a media surface on a disc. An output from the field emission sensor is fed back to an actuator that adjusts fly height. When the head experiences thermal pole tip protrusion at higher temperatures, then the feedback controls and stabilizes the fly height to avoid head crashes.

As fly heights decrease due to market demand for increasing areal density, the control and stability illustrated by the embodiments becomes increasingly important. Additional factors, such as the desire to use silicon as a slider material to gain processing advantages from the semiconductor industry unfortunately adds further to the fly height control problem by increasing the pole tip protrusion at higher temperatures.

Figure 1:
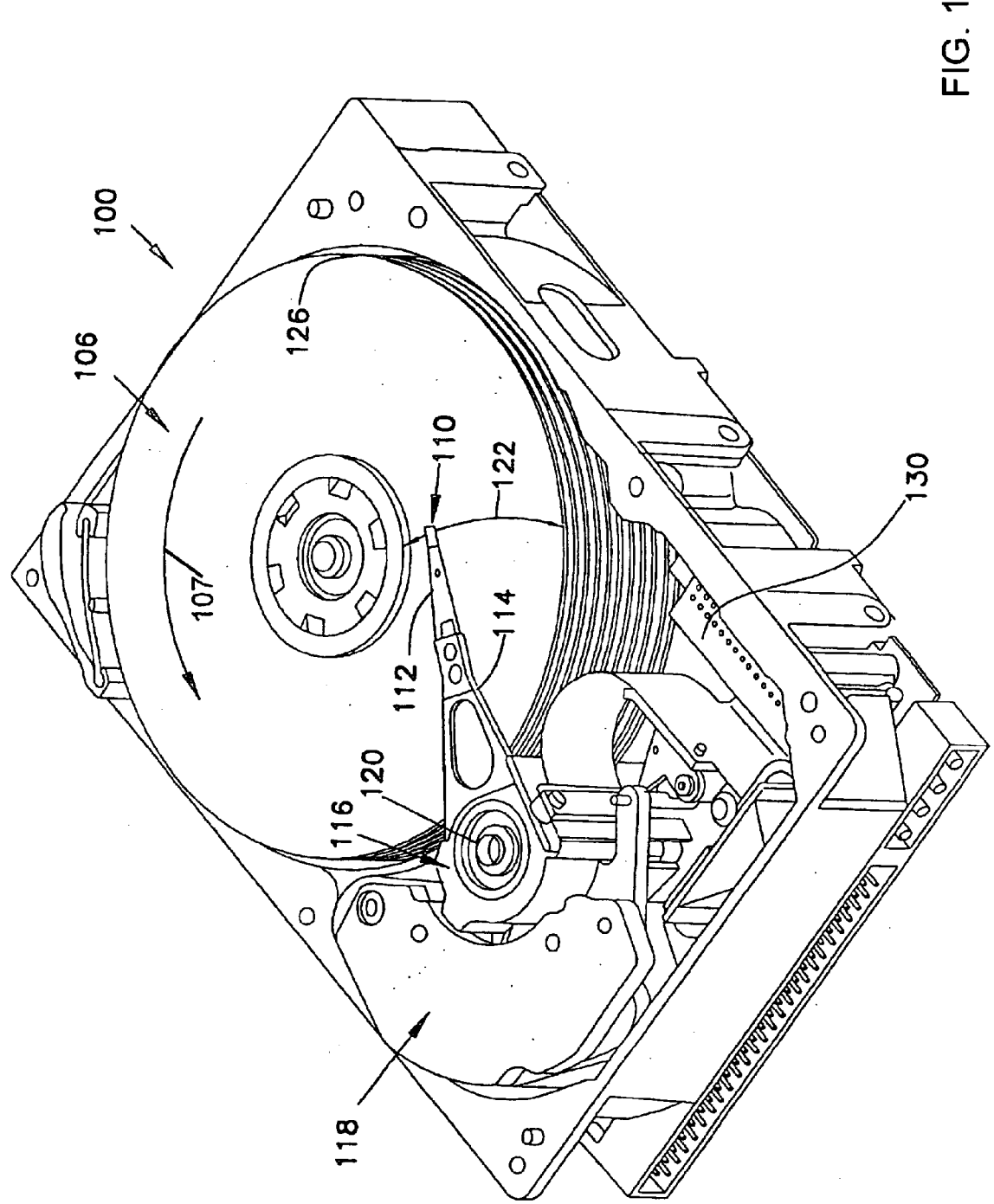
FIG. 1 illustrates a top isometric view of a disc drive.

FIG. 1 illustrates an embodiment of a disc drive 100 including a slider 110 that includes one or more read/write heads. Disc drive 100 includes a disc pack 126 having storage media surfaces 106 that are typically layers of magnetic material. The disc pack 126 includes a stack of multiple discs. A read/write head assembly 112 includes the slider 110 with a read/write transducer for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. The arm 114 presses down on a central gimbal point on the slider 110, providing a load force that holds the slider 110 in close proximity to the storage surface 106. One or more read/write heads are deposited on the slider 110 and fly above the storage surface 106 at a fly height. A circuit at location 130 controls the radial position of the slider 110 and electrically interfaces read/write heads on sliders 110 with a computing environment.

FIGS. 2–3 schematically illustrate a broken away cross-section of a slider 203 flying over a disc media surface 240 at room temperature (FIG. 2) and at an elevated temperature (FIG. 3). During disk drive operation, electrical power is dissipated in the disc drive, particularly in the transducer 236, and the temperature of the slider 203 increases. The temperature of the slider 203 itself and/or of the transducer 236 can be significantly higher than the overall disc drive temperature due to the large amount of heat dissipated in the transducer 236 relative to the small size of the slider 203.

The coefficients of temperature expansion (CTEs) of a substrate 201 and of various deposited layers 202, 236, 210, 231 are typically different from one another. Typically, the magnetic metallic layers 236 in slider 203 have larger CTEs, and insulating layers 202, 231, 210 have lower CTEs. All these layers are grown on substrate 201 that has much larger volume compared to the volume of the layers 231, 210, 202 and the magnetic metallic layers 236. Due to the different CTEs of materials in various head layers, the shape of the slider 203 distorts at elevated temperature. The pole tip recession (PTR) 237 that is present at room temperature as illustrated in FIG. 2 is reduced or completely lost with elevated head temperature as illustrated at FIG. 3. The change of PTR with temperature is historically referred to as thermal PTR (T-PTR). At higher temperatures, however, the pole tip protrudes beyond the substrate surface as illustrated in FIG. 3.

The CTEs of the aluminum oxide layers 202, 231, 210 are close to that of substrate 201, so that the pole/shield protrusion at higher operating temperatures is due primarily to expansion of the metallic layers in transducer 236. This expansion is only weakly constrained by the adjacent substrate 201, basecoat layer 202, and overcoat layers 231, 210.

During drive operation, the slider 203 flies above the spinning magnetic recording media surface 240. Over all operating temperatures of the drive, the fly height 238 needs to be kept low enough as required for reading and writing the desired high areal bit density. The slider 203 should not get in contact with magnetic media surface 240 as illustrated in FIG. 3. The fly height 238 is affected by the shape of the air-bearing surface 222 that is patterned (not illustrated) into the slider substrate 201. It is also affected by a load force applied by an arm 114 (FIG. 1). The performance of the transducer 236 depends primarily on the distance between the recording media and the pole/shield tips of the head 236. There is thus a need to reduce fly height to improve head performance, and a conflicting need to increase fly height to avoid head crashes due to head protrusion at high temperatures as illustrated in FIG. 3. These two conflicting needs are met in a much improved way by the arrangements described below in connection with FIGS. 4–10.

FIG. 2 shows schematically a transducer 236 at room operating temperature flying above a magnetic media surface 240 illustrated with exaggerated roughness. In FIG. 2, the transducer 236 does not contact the highest points 239 of the magnetic media surface 240. FIG. 3 shows schematically the same transducer 236 at high operating temperature. Most of the volume of the transducer 236 is formed by metallic layers and the coil insulator that have large CTEs. Due to the larger CTE of metallic layers in the transducer and possibly also of cured photoresist used as coil insulator, the pole/shield tips of transducer 236 protrude more with respect to the air bearing surface 222 at higher temperature (FIG. 3) than at room temperature (FIG. 2). This effect known as T-PTR places the transducer 236 closer to the magnetic media surface 240 at higher temperatures.

The magnetic transducer 236 has to fly low, close enough to the media, to have good electrical performance. At the same time, the slider 203 has to stay flying under all conditions without mechanically touching the media. If the fly height at lower head temperature (see FIG. 2) is not large enough, the protruded pole/shield tips 235 at higher head temperature (see FIG. 3) hit the media causing thermal asperities. This results in magnetic instabilities and contamination leading to tribological problems, and eventually a head crash. To avoid head-media contact at higher head temperature (FIG. 3), the fly height has to be large enough at lower head temperature (FIG. 2), with undesirable effect on head electrical performance.

It is difficult to keep the fly height low enough over the operating temperature range without having head-media contact. These difficulties are solved in a much improved way by the arrangements described below in connection with FIGS. 4–10.

Figure 4:
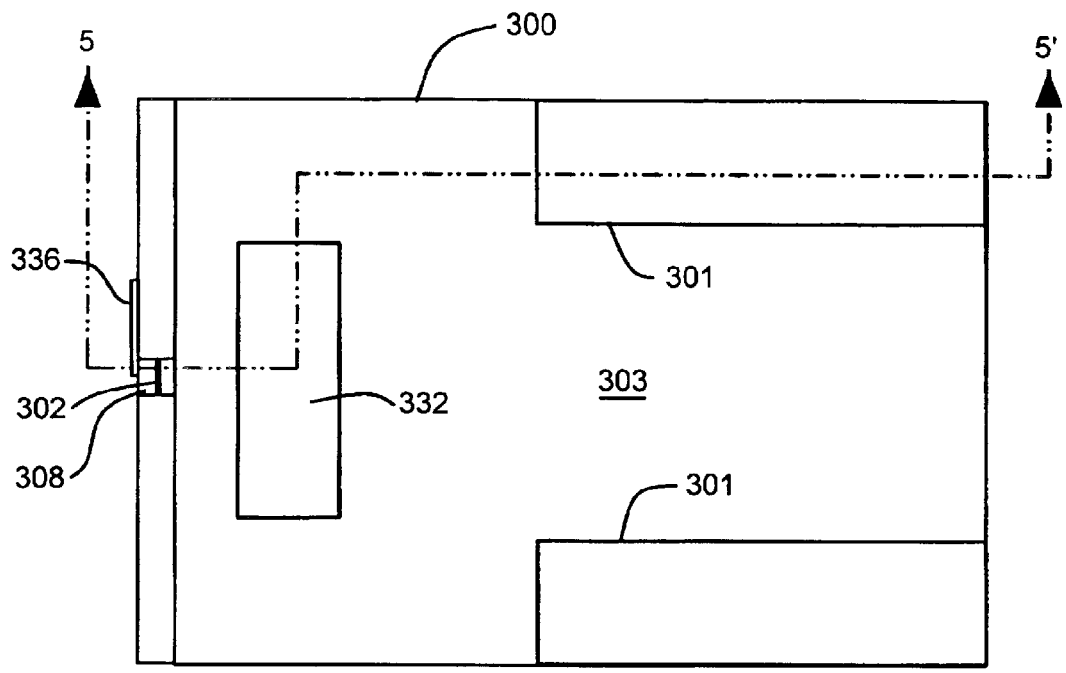
FIG. 4 illustrates a bottom view of a slider that includes an electrode tip.
Figure 5:
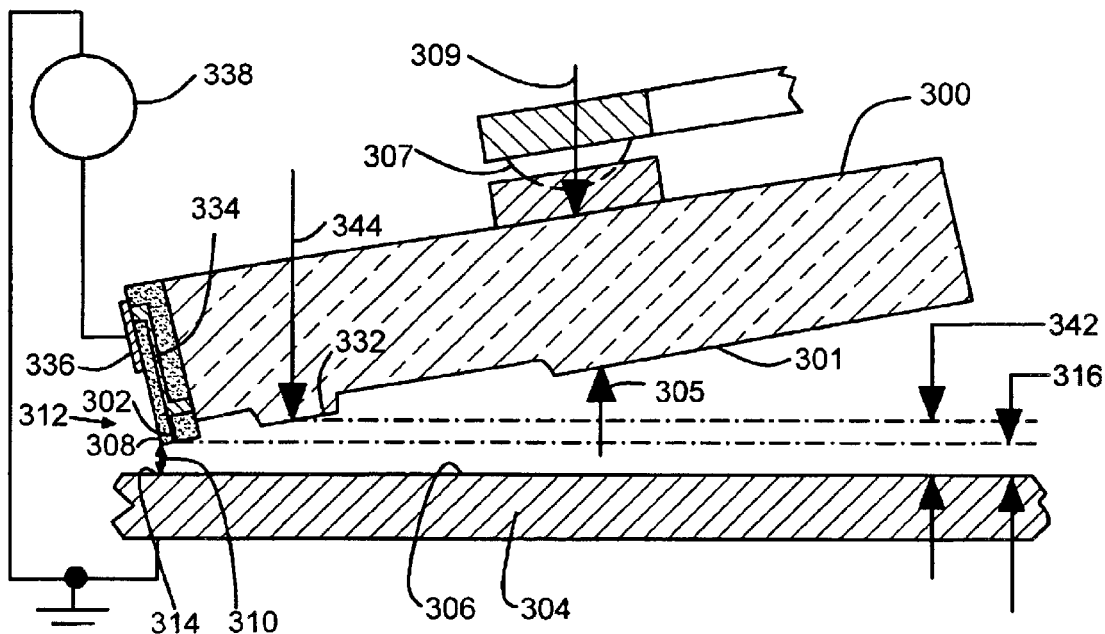
FIG. 5 illustrates a sectional view of a slider taken along line 5–5' in FIG. 4 together with a disc and gimbal.
Figure 6:
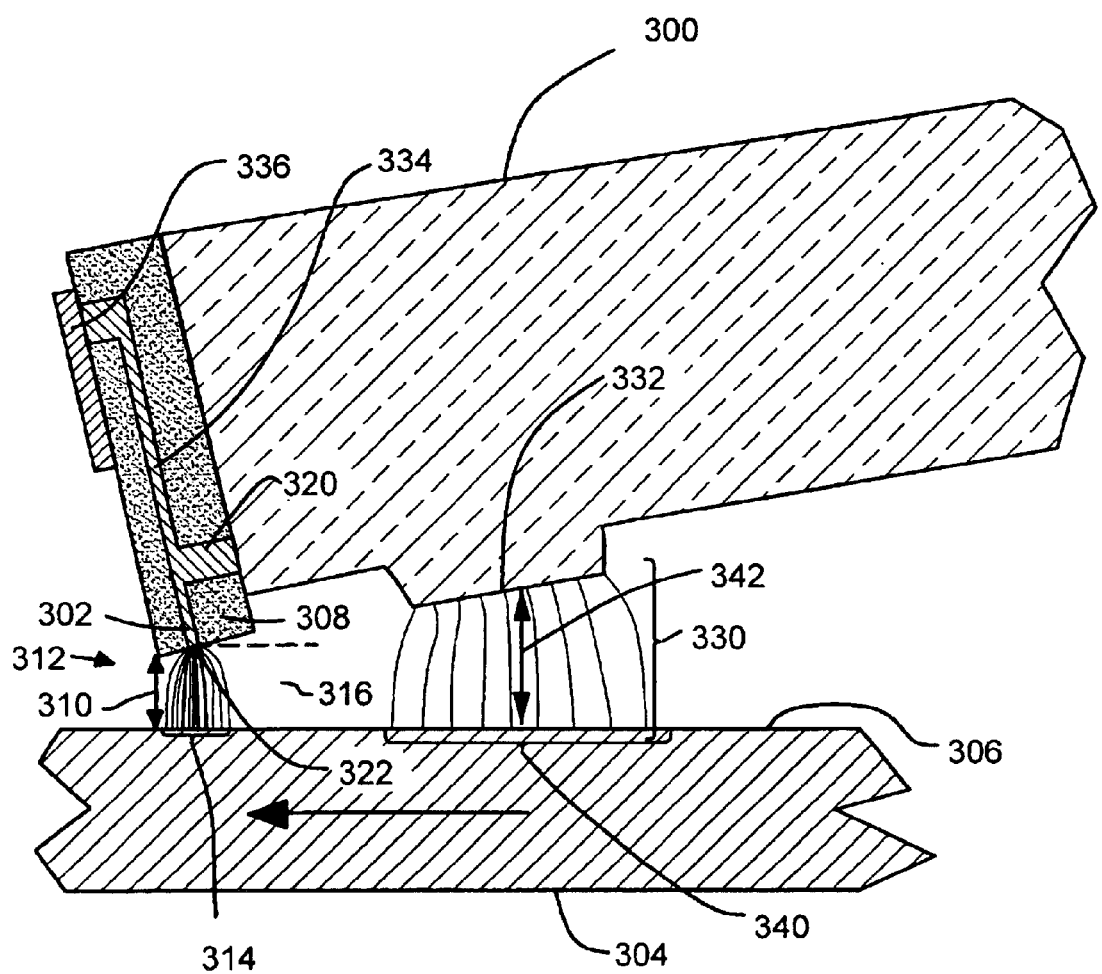
FIG. 6 illustrates an enlarged view of the slider illustrated in FIG. 5.

FIGS. 4–6 illustrates a slider 300 that can be used in a disc drive such as disc drive 100 (FIG. 1) in a way that reduces the pole tip protrusion problems illustrated in FIGS. 2–3.

Some aspects of slider 300 are of conventional design. Slider 300 includes rails 301 that serve as sliding surfaces for the slider 300 to slide on a disc 304 when the disc 304 is stopped or started. The underside 303 of slider 300 is shaped to provide an upward aerodynamic lift force 305. A gimbal point 307 applies a downward load force 309 that is provided by a load beam that is included in a head assembly such as head assembly 112 (FIG. 1). When disc 304 is spinning at its normal operating speed, the aerodynamic lift force 305 lifts slider 300 off the disc 304. The slider 300 flies over the surface of the disc 304 on a layer of air. The disc 304 includes a media surface 306 that includes magnetic material for reading and writing data. A read/write head 308 is deposited on the slider 300. The read/write head 308 is spaced apart from the media surface 306 by a fly height spacing 310. The read/write head 308 has pole tip protrusion at high temperature, however, as explained below, an arrangement is provided that reduces problems with pole tip protrusion and maintains a relatively stable fly height.

An electrode tip 302 is disposed on the slider 300. The electrode tip 302 faces a first portion 314 of the media surface 306 across a gap 316. The electrode tip 302, the gap 316, and the first portion 314 of the media surface 306 together comprise a sensor 312. The sensor 312 conducts an electric current through the gap 316 and provides a sensor electrical output on lead 320 that represents the length of the gap 316.

Sensor 312 is not a capacitive sensor and also does not rely on thermionic emission for sensing. The current through sensor 312 is not a capacitive displacement current, but is approximately in phase with the voltage on sensor 312. Sensor 312 is arranged so that it can operate on a quantum mechanical effect referred to variously as "field emission," "the cold-cathode effect," "auto-electronic emission," or "tunneling."

When a surface (interface) between a conductor and a vacuum (or insulator) is subjected to a low level electric field applied to the vacuum (or insulator) transverse to the surface, there is little or no net flow of electric current across the surface into the vacuum (or insulator). Electrons in the conductor have energy levels up to a so-called Fermi level. There is a high potential barrier at the surface. The electrons do not have a net flow out from the conductor into the vacuum or insulator because the potential barrier is higher than the Fermi level by a large amount called the "work function" of the conductor. When an individual electron does escape from the conductor into the vacuum or insulator, the loss of the electron causes the conductor to have a net positive charge which quickly attracts the electron (which has a negative charge) back into the conductor. With a low electric field, there is no significant field emission effect.

However, it is found that when the field applied transverse to the surface is extremely high, then the potential barrier becomes thin enough so that there is a finite probability that an electron will have enough energy to tunnel through the thin barrier and not be drawn back into the conductor. This probabilistic flow of electrons, which is sometimes referred to as a "tunneling current," has a magnitude that is relatively temperature independent. Once conditions for tunneling are established and maintained, surprisingly large tunneling currents can flow, e.g. thousands of amperes per square centimeter. With an extremely high field near the conductor surface, there is a field emission effect. This "field emission" effect is used in measuring instruments such as a scanning tunneling microscope.

In the sensor 312, the electrode tip 302 is arranged to provide field emission or tunneling current at a tip surface 322 (FIG. 6). The electrode tip 302 is formed as a microstructure. The electrode tip has a tip surface adapted to provide quantum mechanical field emission current through the gap 316. The small area of tip surface 322 facing the first portion 314 of the media surface 306 provides for a small field emission current through the gap 316. The electrode tip 302 is also formed as a relatively thin layer that provides sharp edges. This sharp edged feature produces high electric field strength (volts/meter) around the tip surface 322 with a relatively low voltage applied across the gap 316, in other words between the electrode tip 302 and the portion 314 of the media surface 306. A boundary layer of air at the moving media surface passes through the gap 316, sweeping away any ionized gasses that might otherwise accumulate in the gap. The high electric field strength near tip surface 322 produces conditions for tunneling. As will be explained in more detail below in connection with FIG. 8, the tunneling current is also limited by electrical circuitry connected to the electrode tip 302. Tip 302 is connected to a resistor 334. Resistor 334 connects to a contact pad 336. Contact pad 336 connects to an electric energization source 338.

In FIGS. 4–6, a capacitive actuator 330 (FIG. 6) is also provided that adjusts the fly height spacing 310 as a function of a received actuator electrical input at a capacitor plate 332. Capacitor plate 332 is a mesa that is formed in the conductive body of slider 300. Slider 300 is preferably formed of doped silicon. The capacitive actuator 330 comprises the first capacitive electrode surface 332 that is disposed on the slider 300 and a facing second portion 340 of the media surface 306 that forms a second capacitive electrode. In one preferred arrangement, the first capacitive electrode surface 332 is spaced apart from the second capacitive electrode 340 by a capacitor spacing 342 that is greater than the gap spacing 316 to provide electrical feedback gain.

The electrode tip 302 is electrically connected via conductor 320 and slider 300, which is conductive, to a capacitor plate 332. The capacitor plate 332 serves as an actuator electrical input. These electrical connections provide a feedback circuit that provides the actuator electrical input as a feedback function of the sensor electrical output to control the fly height spacing 310. The fly height spacing 310 is stabilized with respect to temperature and the slider 300 can be flown closer to the media surface to obtain higher areal density with reduced likelihood of a crash.

In one preferred arrangement, the gap 316 is in a range of 5 to 15 nanometers, or about the same length as the fly height spacing 310.

The electrode tip 302 has the tip surface 322 facing the gap 316. The tip surface 322 can be metal, or can comprise one or more coatings with determined field emission properties such as p-doped diamond, diamond-like carbon (DLC), tungsten, molybdenum, lanthanum hexaboride, silica particles and beryllia particles. In one preferred arrangement, the electrode tip 302 is formed as part of a layer of material in the read/write head 308. In this preferred arrangement, the electrode tip 302 tends to protrude at higher temperatures in the same way as the pole tip protrusion of the read/write head 308.

In operation, the read/write head 308 flies over the media surface 306 at a fly height 310. As the read/write head 308 gets hotter, it protrudes more toward the media surface 306. The electrode tip 302 of the quantum mechanical sensor 312 also protrudes, changing the sensor output present on conductor 320. The changing sensor output on conductor 320 is fed back through slider 300 to the capacitive actuator 330. The capacitive actuator 330 responds by reducing its attractive force 344, thereby raising the slider 300 to at least partially compensate for the protrusion at high temperature. The fly height 310 is thus stabilized, and the read/write head 308 can be run closer to the media surface 306 without fear of damage due to pole tip protrusion. With this closer spacing, higher bit densities are achieved.

Figure 7:
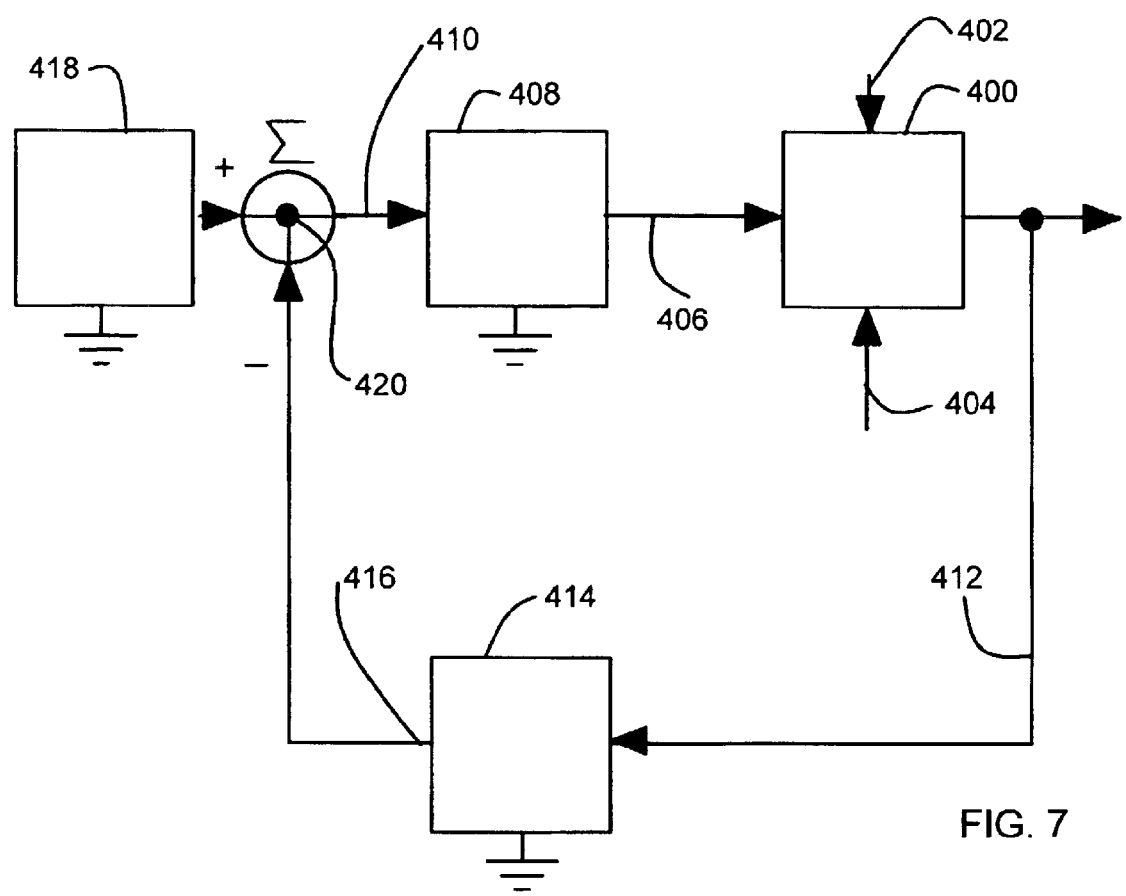
FIG. 7 illustrates a block diagram corresponding with the arrangement illustrated in FIG. 5.

FIG. 7 illustrates a block diagram corresponding with the arrangement illustrated in FIG. 5. FIG. 7 illustrates control system aspects of the arrangement in FIG. 5. In FIG. 7, a slider body 400 is acted on by forces that include a downward load force 402 applied at a gimbal point, an upward aerodynamic lift force 404 applied to the underside of the slider body 400 and a controlled downward actuator force 406 due to electrostatic attraction in a capacitive actuator 408 that actuates the slider body relative to a media surface. The capacitive actuator 408 is controlled by a received actuator electrical input 410, also called an error signal. The capacitive actuator 408 and the slider body 400 comprise a feedforward path. The slider body 400 responds to the forces applied to it and flies at a particular fly height and a corresponding gap length 412.

The gap length 412 is sensed by a field emission sensor 414 which comprises a feedback path. The field emission sensor 414 presents an impedance at sensor electrical output 416 that represents the gap length 412. An electrical energization source 418 provides an electrical current through a hard-wired summing junction 420 to the field emission sensor 414. The electrical energization source 418 provides a set point for the control system. The voltage at electric output 416 is a function of both the set point and the impedance of sensor 414. The voltage at electric output 416 is representative of the gap length. The voltage at electrical output 416 is coupled via the summing junction 420 to the capacitive actuator 408 as actuator electrical input 410. The feedforward path, the feedback path and the summing junction establish closed loop control of the fly height. When temperature increases, the pole tips protrude more and the gap length 412 decreases. The field emission sensor 414 senses the decrease and a correspondingly decreased sensor output voltage feeds back to the capacitive actuator 408. The capacitive actuator 408 produces decreased attractive actuator force 406 at the decreased voltage. The decreased attractive actuator force 406 causes the fly height to increase, thereby moving the protruding pole tip away from the media surface. A fly height with increased stability as a function of temperature is thus established.

Figure 8:
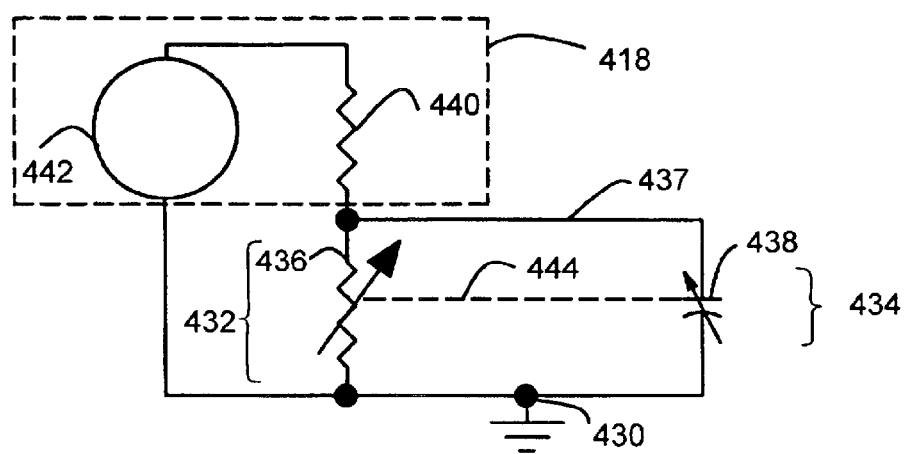
FIG. 8 illustrates an electrical schematic diagram corresponding with the arrangement illustrated in FIG. 5.

FIG. 8 illustrates an electrical schematic diagram corresponding with the arrangement illustrated in FIGS. 4–7. The electrical schematic emphasizes the simplicity of the circuitry. The disc is grounded as illustrated at 430. This provides a ground connection for both the field emission sensor 432 and the capacitive actuator 434. The electrode tip 436 on the slider is connected directly via line 437 to the capacitor plate 438 that is integral with the slider. Alternatively, an insulating slider can be used and a separate conductor can provide a connection on the slider between the electrode tip and the capacitance surface. This line 437 corresponds to the path through conductor 320 and conductive slider 300 to the capacitor plate 332 in FIG. 6. A resistor 440 is connected to the electrode tip 436. Resistor 440 corresponds to the resistor 334 in FIG. 6. Resistor 440 is also connected to a voltage source 442. The resistor 440 and the voltage source 442 together comprise an electrical energization source 418. The resistance of resistor 440 and the voltage of voltage source 442 are selected to provide a set point for control of the length of the gap and thus fly height. It will be understood by those skilled in the art that the electrical energization source can alternatively comprise a controlled current source. A dashed line 444 illustrates the slider's mechanical coupling between the electrode tip 436 and the capacitor plate 438.

Figure 9:
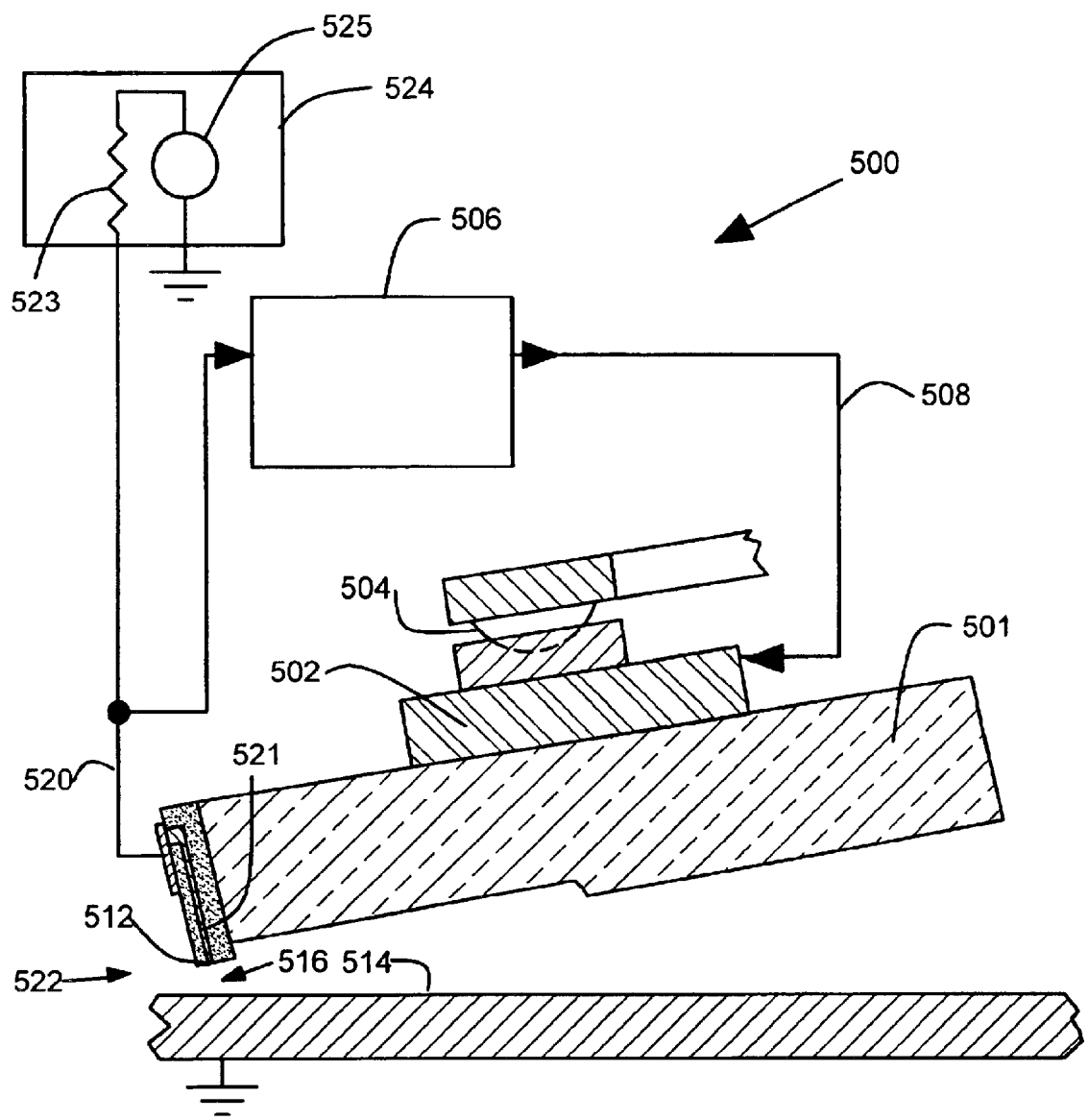
FIG. 9 illustrates an arrangement with an actuator deflecting a slider relative to a gimbal point.

FIG. 9 illustrates an alternative arrangement 500 that is similar to the arrangement shown in FIGS. 4–8. In FIG. 9, however, the actuator 330 (FIG. 6) which operates across a capacitive air spacing between a slider and a disc is eliminated. In FIG. 9, an actuator 502 is provided that actuates a slider relative to a gimbal point 504. Also, in FIG. 9, a controller 506 is added to provide gain and feedback along line 508 to the actuator 502.

FIG. 9 illustrates a slider 501 that can be used in a disc drive such as disc drive 100 (FIG. 1) in a way that reduces the pole tip protrusion problems illustrated in FIGS. 2–3. Some aspects of slider 501 are of conventional design as explained above with respect to similar slider 300.

An electrode tip 512 is disposed on the slider 501. The electrode tip 512 faces a media surface 514 across a gap 516. The electrode tip 512, the gap 516, and the media surface 514 together comprise a sensor 522. The sensor 522 conducts an electric current through the gap 516 and provides a sensor electrical output on lead 521 that represents the length of the gap 516. Lead 521 connects via line 520 and resistor 523 to potential source 525. Sensor 512 is not a capacitive sensor and also does not rely on thermionic emission for sensing. Sensor 512 is arranged so that it can operate on a quantum mechanical effect referred to variously as "field emission," "the cold-cathode effect," "auto-electronic emission," or "tunneling." The sensor 522 is generally similar to the sensor 312 illustrated above.

The actuator 502 responds to the controller output on line 508 by expanding its thickness (approximately vertically in FIG. 9), and thereby varies the gap 516 and the fly height. Actuator 502 can be a capacitive or piezoelectric type actuator. It will be understood by those skilled in the art that the arrangement illustrated in FIG. 9 is schematic and that a wide variety of mechanical support (e.g., gimballing) arrangements for slider 501 can be adapted to use the feedback arrangement shown. Electrical energization source 524 can be a separate circuit as illustrated or can be integrated into the controller 506.

Figure 10:
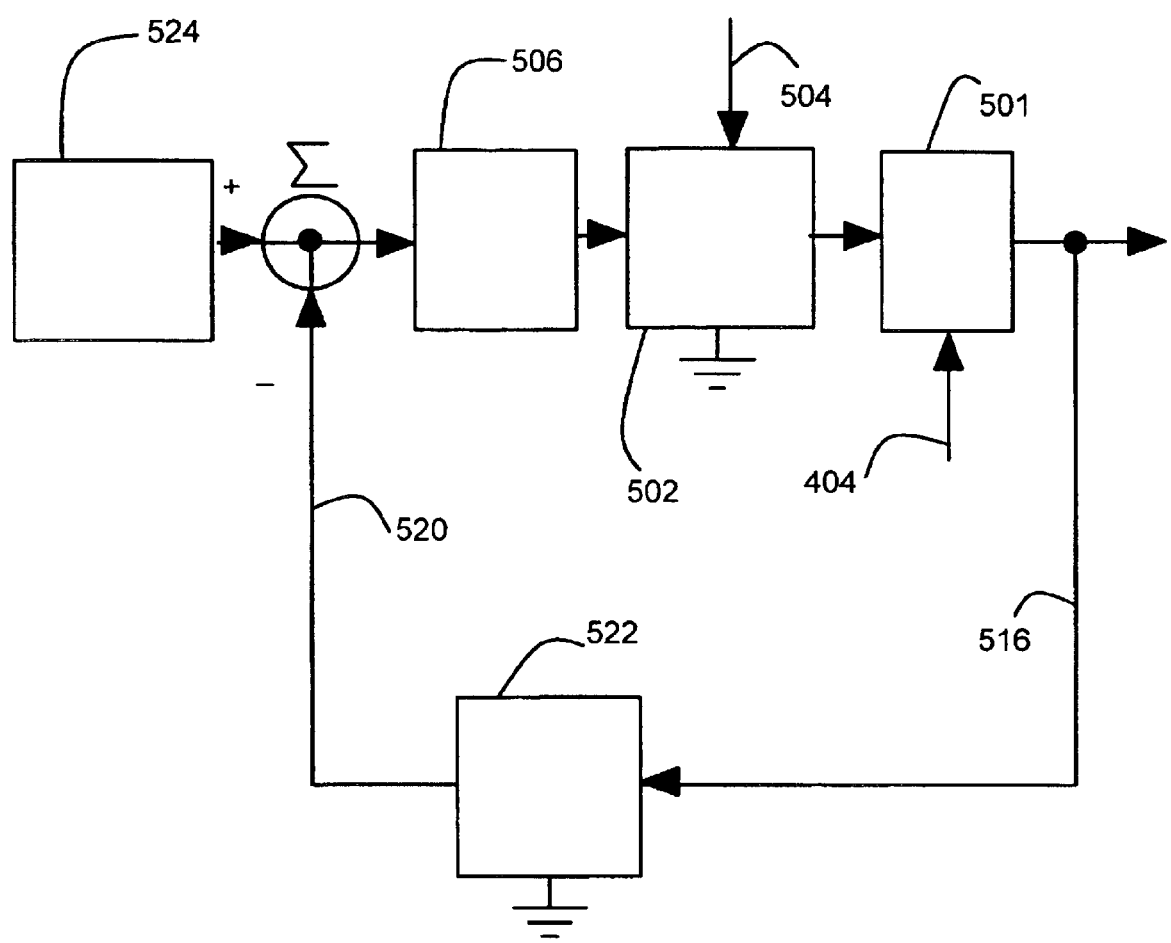
FIG. 10 illustrates a block diagram corresponding with the arrangement illustrated in FIG. 9.

FIG. 10 illustrates a block diagram corresponding with the arrangement illustrated in FIG. 9, and the reference numbers used in FIG. 10 are the same as those used in FIG. 9.

Capacitive (electrostatic) fly height actuators have been proposed in the past, but have been of limited value due to the 1/spacing$^2$ relationship between the slider to disc attractive force and the distance. The 1/spacing$^2$ relationship tends to make control unstable.

In the absence of a high bandwidth measurement of the fly height, this limits the stable range of control over the fly height to about a 30% reduction from the nominal fly height with no applied voltage. Furthermore, some means of measuring or estimating the fly height is required in order to control it. Using the signal amplitude from the head is a simple method, but limits the bandwidth of the feedback as this only provides a useful measurement at the servo sectors, since the amplitude of the data regions are subject to variability due to position error as well as fly height changes. Capacitive fly height sensors have been considered, but require complex electronic circuitry that adds to the cost of the system.

Since the voltage at the field emission electrode tip is approximately proportional to the electrode to disc spacing, and the electrostatic force is approximately proportional to the square of the electric field strength, the fly control electrostatic force electrode geometry must be designed to provide feedback gain. If the fly control electrode to disc spacing were the same as the field emission electrode to disc spacing, the electrostatic force would be constant regardless of the spacing and there would be no stabilization of the fly height. By placing the electrode tip and capacitive electrode on a slider as shown in FIG. 6, so that the spacing of the fly control electrode to disc is several times larger than the field emission to disc spacing, feedback gain can be generated.

With a nominal spacing of 0.3 $\mu$in (microinch) at the emission electrode and 1.0 $\mu$in at the control electrode, a 0.1 $\mu$in decrease in spacing will reduce the electrostatic force by 45%, and a 0.1 $\mu$in increase in spacing will increase the electrostatic force by 46%. If higher feedback gain is required, the emission electrode can be used as a spacing sensor to provide a measurement signal to an electronic feedback circuit used to control the voltage applied to the fly control electrode. This also gives greater flexibility in the selection of material for the emission electrode, as the voltage on the control electrode is not limited to being equal to the emission electrode voltage.

Since the slider air bearing surface (ABS) is coated with a DLC (diamond like carbon) layer for protection against both mechanical wear and chemical corrosion, it would be desirable to fabricate the field emission electrodes in a manner that does not disturb the function of the protective DLC coating. This can be done by producing the field emission electrodes out of the same metal as the write transducer poles, coating the ABS (including the field emission electrodes) with DLC in the normal manner, and finally ion implanting the DLC directly over the field emission electrodes to make it conductive. In some applications, the DLC coating can be produced with sufficient conductivity that the ion implantation step will not be required. At a spacing of 0.3 $\mu$in (7.6 nm), the p-doped diamond material at 70V/$\mu$m would produce 0.53V, which is an ideal level as a sense signal for a feedback control circuit. For directly driving the fly control electrode, a somewhat greater voltage is desirable. The metal/insulator Beryllia particle system at $5 \times 10^8$ V/m would produce a voltage of 3.8V at the 7.6 nm fly height.

In summary, a disc drive (100) includes a disc (304) that includes a media surface (306, 514). The disc drive (100) also includes a slider (300, 501) that includes a read/write head (308) that is spaced apart from the media surface (306, 514) by a fly height spacing (310). A field emission sensor (312, 512) comprising an electrode tip (302) is disposed on the slider (300, 501) and faces a first portion (314) of the media surface (306) across a gap (316, 516). The sensor (312, 512) conducts an electric current through the gap (316, 516) and provides a sensor electrical output (416) representative of the length of the gap (316, 516). An actuator (330, 502) adjusts the fly height spacing as a function of a received actuator electrical input (410, 508). A feedback circuit (410, 420, 506) provides the actuator electrical input as a feedback function of the sensor electrical output to control the fly height spacing.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, an insulating slider can be used and a separate conductor can provide a connection on the slider between the electrode tip and the capacitance surface. In addition, although the preferred embodiment described herein is directed to a magnetic disc drive, it will be appreciated by those skilled in the art that the teachings of the present invention can be applied to other systems, like magnetooptical drives or optical drives, without departing from the scope and spirit of the present invention.

What is claimed is:

1. A method of controlling fly height in a disc drive, comprising:
   providing a fly height spacing between a read/write head on a slider and a media surface on a disc;
   sensing with an electrode tip that is disposed on the slider and that faces a first portion of the media surface across a gap, the electrode tip conducting an electric current that passes through the gap, and the electrode tip providing a sensor electrical output representative of the length of the gap;
   capacitively actuating the fly height spacing, using a capacitor plate that is on the slider, as a function of a received actuator electrical input; and
   providing a feedback circuit comprising a lead directly connected from the electrode tip to the capacitor plate to control the fly height spacing.

2. The method of claim 1 wherein the electric current that passes through the gap is a quantum mechanical field emission current from the electrode tip.

3. The method of claim 2 further comprising:
   controlling the gap in a range of 5 to 15 nanometers.

4. The method of claim 1 further comprising:
   providing the electrode tip with a tip surface comprising material selected from the group: p-doped diamond, diamond-like carbon (DLC), tungsten, molybdenum, lanthanum hexaboride, silica particles and beryllia particles.

5. The method of claim 1 further comprising:
   forming the electrode tip as part of a layer of metal in the read/write head.

6. The method of claim 1 further comprising mechanically coupling the electrode tip to the capacitive actuating.

7. The method of claim 1 wherein the capacitive actuation is performed by a first capacitive electrode surface that is disposed on the slider and that faces a second portion of the disc that forms a second capacitive electrode.

8. The method of claim 7 further comprising:
   spacing the first capacitive electrode surface apart from the second portion of the disc by a capacitor spacing that is greater than the gap length.

9. A disc drive, comprising:
   a disc that includes a media surface;
   a slider that includes a read/write head that is spaced apart from the media surface by a fly height spacing;
   a sensor comprising an electrode tip disposed on the slider and facing a first portion of the media surface across a gap, the sensor being adapted to conduct an electric current through the gap and to provide a sensor electrical output representative of the length of the gap;
   a capacitive actuator adjusting the fly height spacing as a function of a received actuator electrical input, the capacitive actuator including a capacitor plate that is on the slider; and
   a feedback circuit comprising a lead that directly connects from the electrode tip to the capacitor plate to control the fly height spacing.

10. The disc drive of claim 9 wherein the electrode tip has a tip surface adapted to provide quantum mechanical field emission current through the gap.

11. The disc drive of claim 9 wherein the gap is in a range of 5 to 15 nanometers.

12. The disc drive of claim 9 wherein the tip has a tip surface comprising material selected from the group: p-doped diamond and diamond like carbon (DLC), tungsten, molybdenum, lanthanum hexaboride, silica particles and beryllia particles.

13. The disc drive of claim 9 wherein the electrode tip is part of a layer of material in the read/write head.

14. The disc drive of claim 9 wherein the capacitive actuator is mechanically coupled to the electrode tip.

15. The disc drive of claim 9 wherein the capacitive actuator comprises a first capacitive electrode surface that is disposed on the slider and that faces a second portion of the media surface that forms a second capacitive electrode.

16. The disc drive of claim 15 wherein the first capacitive electrode surface is spaced apart from the second capacitive electrode by a capacitor spacing that is greater than the gap spacing.

17. A disc drive, comprising:
   a slider including a read/write head, and a disk including a media surface spaced apart from the read/write head by a fly height spacing and a capacitive actuator adjusting the fly height spacing as a function of a received actuator electrical input, the capacitive actuator including a capacitor plate that is on the slider; and
   feedback means for sensing the fly height spacing as a function of a quantum mechanical current across a gap between an electrode tip on the slider and the media surface, the feedback means generating the actuator electrical input to control the fly height spacing, the feedback means comprising a lead that directly connects the electrode tip to the capacitor plate.

18. The disc drive of claim 17 further comprising mechanical coupling between the means for sensing the fly height and the capacitive actuator.

* * * * *